United States Patent
Guo et al.

(10) Patent No.: US 11,927,786 B2
(45) Date of Patent: Mar. 12, 2024

(54) CONSISTENT BRIGHTNESS CONTROL OF A CARRIER LIGHT PIPE

(71) Applicant: Dell Products L.P., Round Rock, TX (US)

(72) Inventors: Qingqiang Guo, Shanghai (CN); Harris Di Dihuweii, Shanghai (CN); William A. Smith, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 17/577,474

(22) Filed: Jan. 18, 2022

(65) Prior Publication Data
US 2023/0228929 A1 Jul. 20, 2023

(51) Int. Cl.
*G11B 33/12* (2006.01)
*F21V 8/00* (2006.01)
*G11B 33/10* (2006.01)

(52) U.S. Cl.
CPC ......... *G02B 6/0008* (2013.01); *G02B 6/0006* (2013.01); *G11B 33/10* (2013.01); *G11B 33/128* (2013.01)

(58) Field of Classification Search
CPC .... G02B 6/0008; G02B 6/0006; G11B 33/10; G11B 33/128
See application file for complete search history.

(56) References Cited

U.S. PATENT DOCUMENTS

| | | | |
|---|---|---|---|
| 7,321,489 B2 * | 1/2008 | McAlister | G06F 1/187 361/679.33 |
| 9,420,718 B2 * | 8/2016 | Du | G06F 1/183 |
| 11,200,920 B1 * | 12/2021 | Chang | G11B 33/022 |
| 11,385,689 B2 * | 7/2022 | Khan | H05K 7/2039 |
| 11,556,156 B2 * | 1/2023 | Norton | H05K 7/14 |
| 2020/0137915 A1 | 4/2020 | Morihata et al. | |

* cited by examiner

*Primary Examiner* — Anthony Q Edwards
*Assistant Examiner* — Hung Q Dang
(74) *Attorney, Agent, or Firm* — Larson Newman, LLP (57) ABSTRACT

A device carrier for an information handling system includes a latch, an interface, lights located on a front of the latch, and first and second light pipes. The latch holds the device carrier within the information handling system. The first light pipes are located within the latch, and provide light to the lights located on the front of the latch. The second light pipes are located within the interface and the latch, and provide the light to the first light pipes. The location of the second light pipes enables the same brightness of the light provided to the lights when a long device is inserted within the device carrier as compared to when a short device is inserted within the device carrier.

18 Claims, 8 Drawing Sheets

CONSISTENT BRIGHTNESS CONTROL OF A CARRIER LIGHT PIPE

FIELD OF THE DISCLOSURE

The present disclosure generally relates to information handling systems, and more particularly relates to consistent brightness control of a carrier light pipe in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A device carrier for an information handling system includes a latch, an interface, lights located on a front of the latch, and first and second light pipes. The latch may hold the device carrier within the information handling system. The first light pipes may be located within the latch, and may provide light to the lights located on the front of the latch. The second light pipes may be located within the interface and the latch, and may provide the light to the first light pipes. The location of the second light pipes may enable the same brightness of the light provided to the lights when a long device is inserted within the device carrier as compared to when a short device is inserted within the device carrier.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
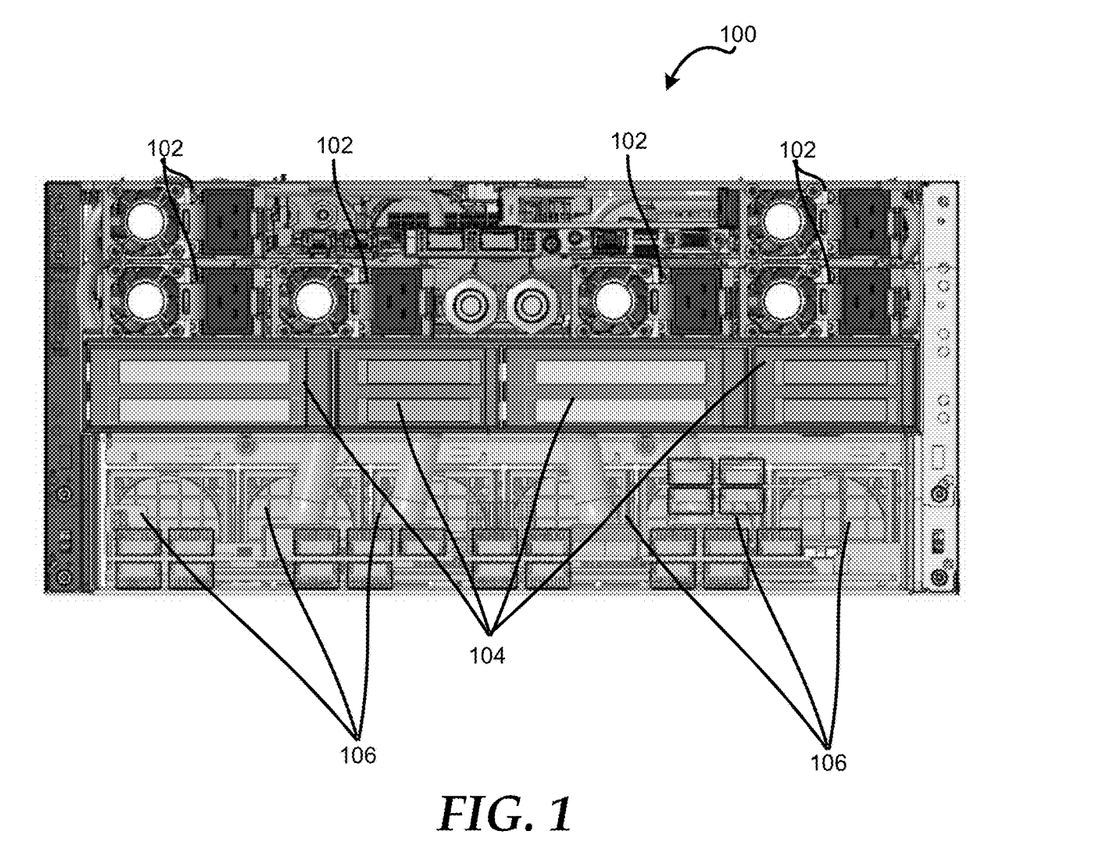
FIG. 1 is a diagram of an information handling system including a hybrid cooling system according to at least one embodiment of the disclosure.

FIG. 1 illustrates a server or information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Figure 5:
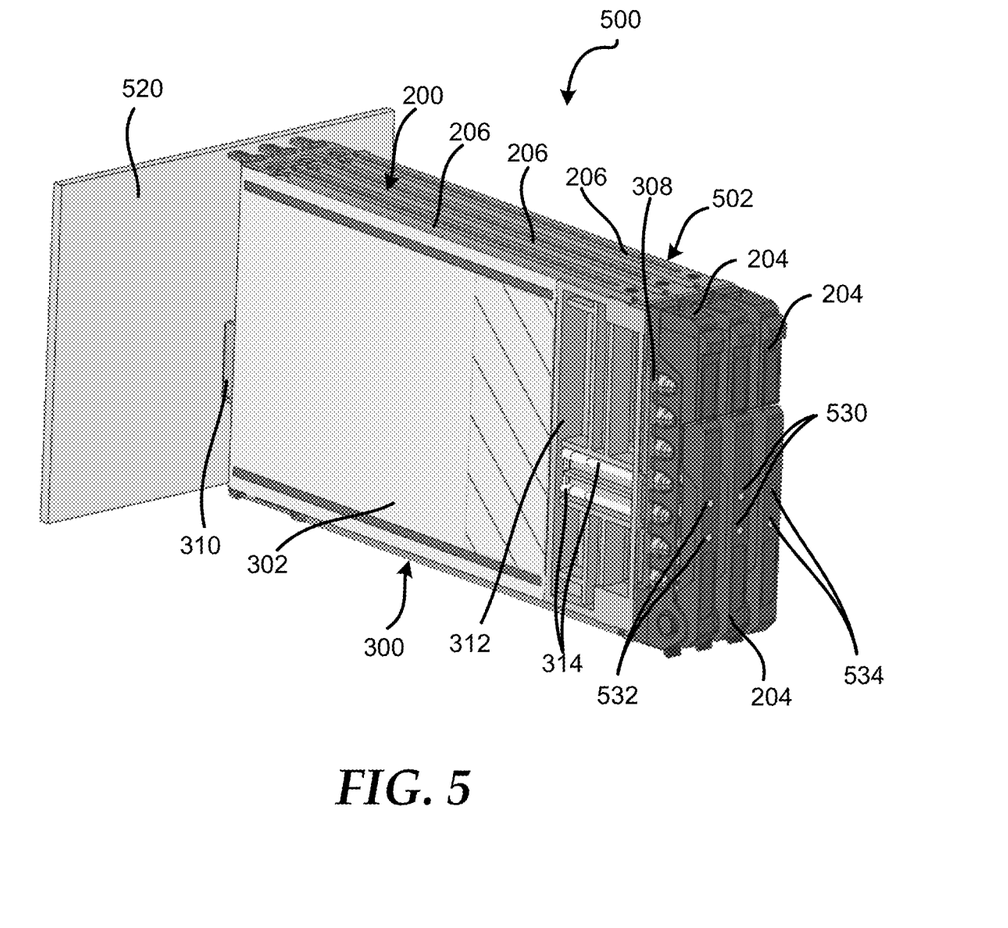
FIG. 5 is a diagram of multiple devices connected to a backplane of an information handling system according to at least one embodiment of the present disclosure.

Server 100 may be configured with any suitable number of components or devices, such as power supply devices 102, devices 104, and multiple cooling fans 106. Power supply devices 102 may provide power to the components of server 100, such as devices 104. Cooling fan 106 may provide air cooling to the components of server 100, such as devices 104. In an example, devices 104 may be any suitable type of devices including, but not limited to, storage devices. In certain examples, devices 104 may be inserted into server 100 in any suitable orientation, such as horizontal as shown in FIG. 1, vertical as shown in FIG. 5, or the like.

In an example, different devices 104 may be one of multiple form factors including, but not limited to, a shorter device, and a longer device. In certain examples, the devices may be any suitable device, such as an enterprise and data-center solid state drive (SSD) form factor (EDSFF) E3 drive. The slots within server 100 may be designed to receive both a short device and a long device. In an example, the slot of server 100 may be the depth to accommodate the longer device. In this example, the frame of a short device 104 may be designed to be substantially similar to the frame of a longer device.

In an example, device 104 includes any suitable number of light emitting diodes (LEDs) to provide status indicators to an individual. However, when a short device 104 is placed within a long carrier, the LEDs of the short device may not have the same brightness as the LEDs of a long device in a long carrier. The variation of LED brightness between long devices and short devices may cause a low user experience. In an example, the LED brightness may result from an additional light pipe inserted between the short device and the end of the long carrier, and light pipes may be significantly lossy. The lossy characteristics of the light pipes and an additional interface between light pipes may result in the inconsistent brightness. Server 100 may be improved by a consistent brightness between drive types as will be described herein.

Figure 2:
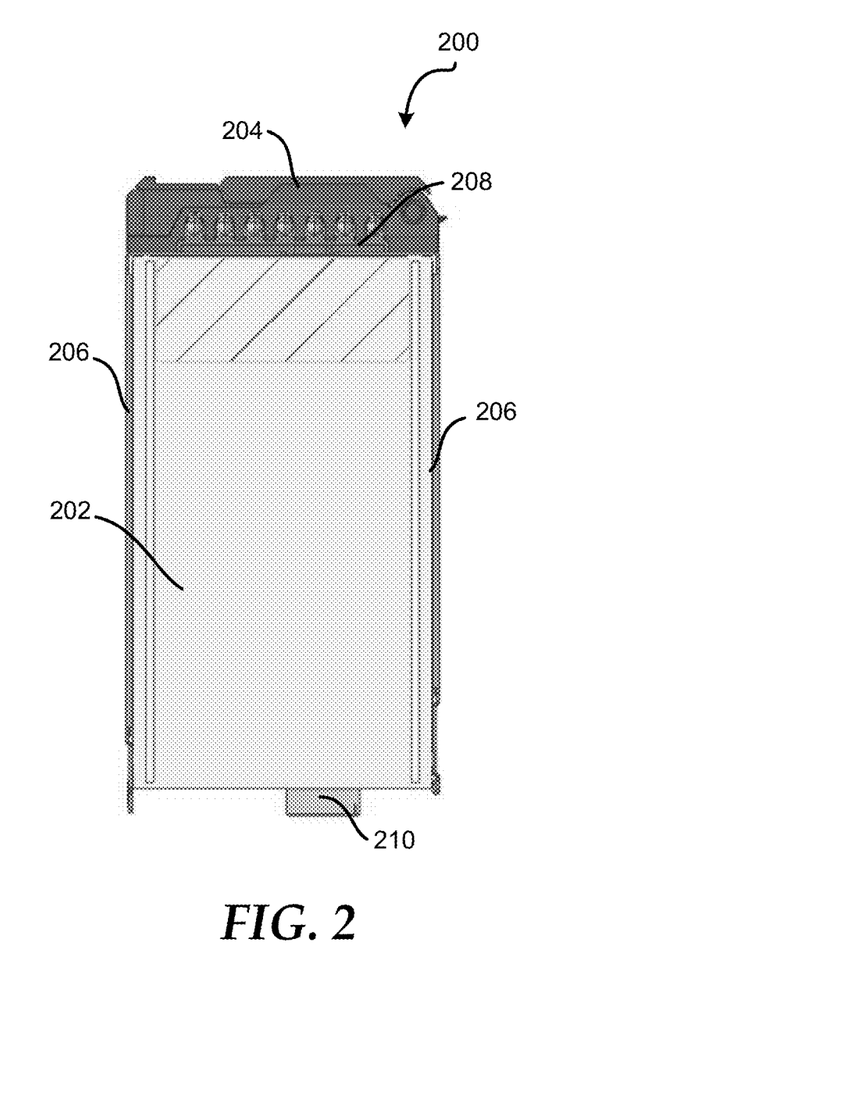
FIG. 2 is a diagram of a long carrier with a long device according to at least one embodiment of the present disclosure.
Figure 7:
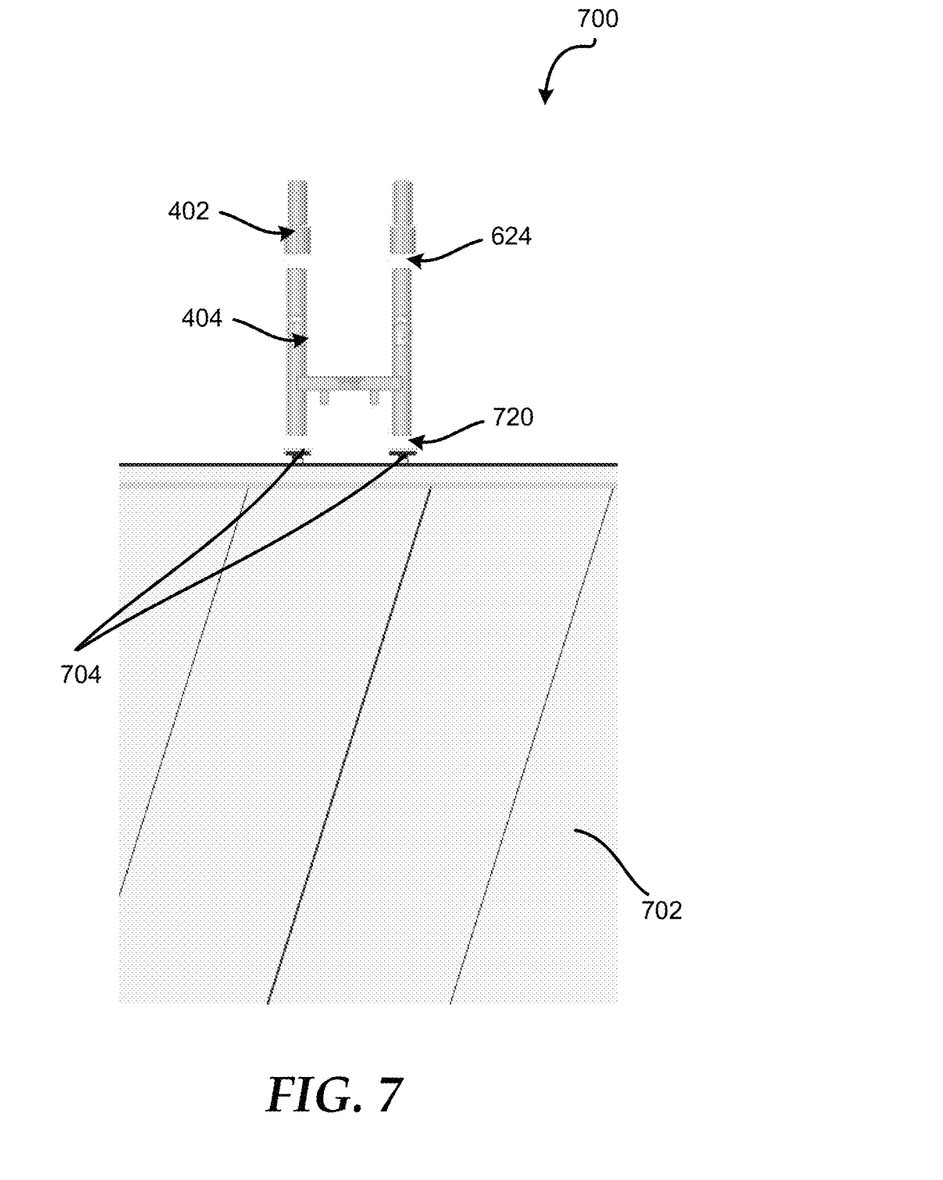
FIG. 7 is a diagram of multiple light pipes with a long device according to at least one embodiment of the present disclosure.

FIG. 2 illustrates a long carrier 200 with a long device 202 according to at least one embodiment of the present disclosure. Long carrier 200 includes a latch 204, long rails 206, and interface 208. Long device 202 includes a connector 210 to communicate with a backplane of an information handling system, such as server 100 of FIG. 1. In an example, device 202 may include status LEDs, as shown in FIG. 7 below, and light from the LEDs may be transferred through interface 208 to the front of latch 204 as will be described in detail below.

Figure 3:
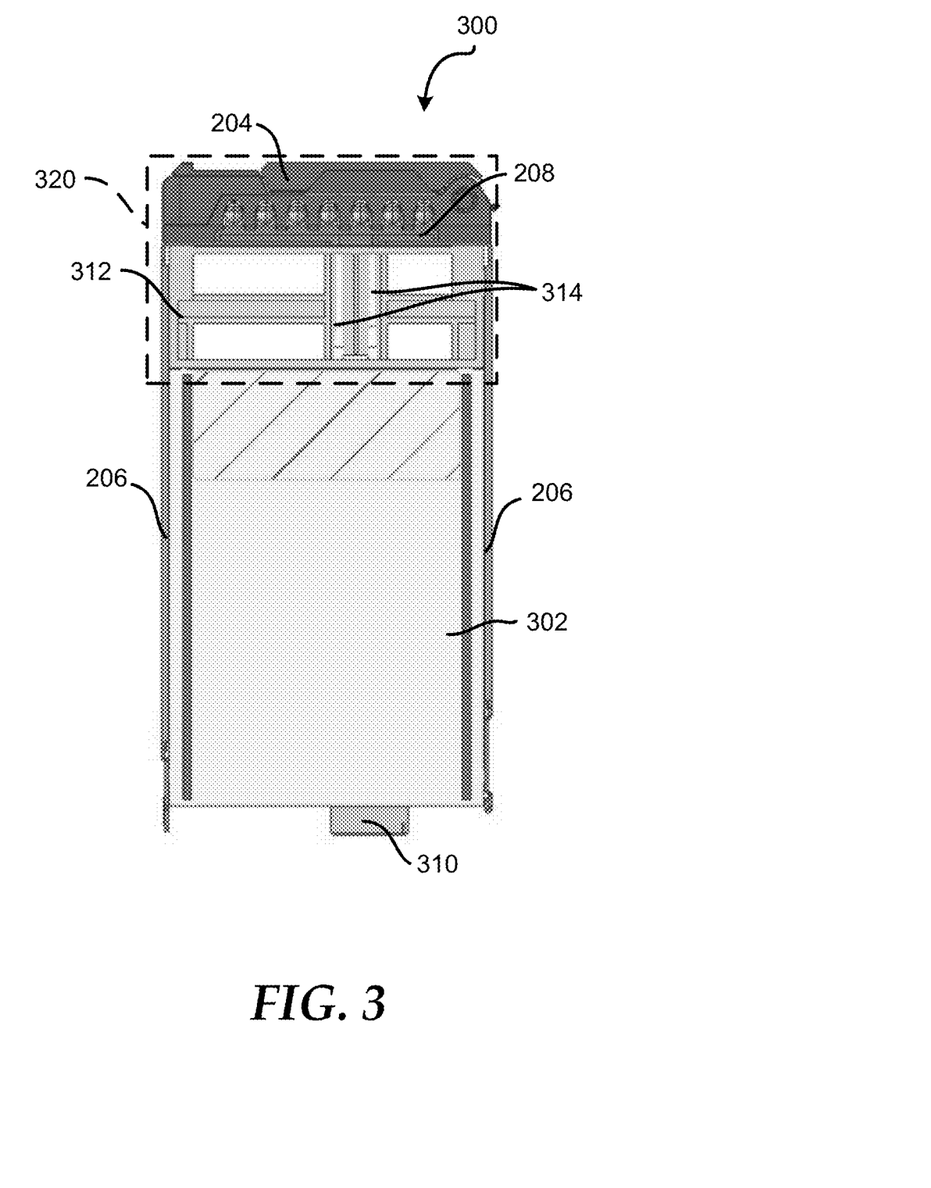
FIG. 3 is a diagram of a long carrier with a short device according to at least one embodiment of the present disclosure.

FIG. 3 illustrates a long carrier 300 with a short device 302 according to at least one embodiment of the present disclosure. Long carrier 300 includes a latch 204, long rails 206, and interface 208. In an example, latch 204, long rails 206, interface 208, and other components of long carrier 300 may be substantially similar to those of long carrier 200 of FIG. 2. Short device 302 includes a connector 310 to communicate with a backplane of an information handling system, such as server 100 of FIG. 1. Short device 302 may be any particular length shorter than long rails 206, such that an adapter 312 may be inserted within carrier 300 between the short device and interface 208 of latch 204. Multiple light pipes 314 are located within adapter 312.

Figure 6:
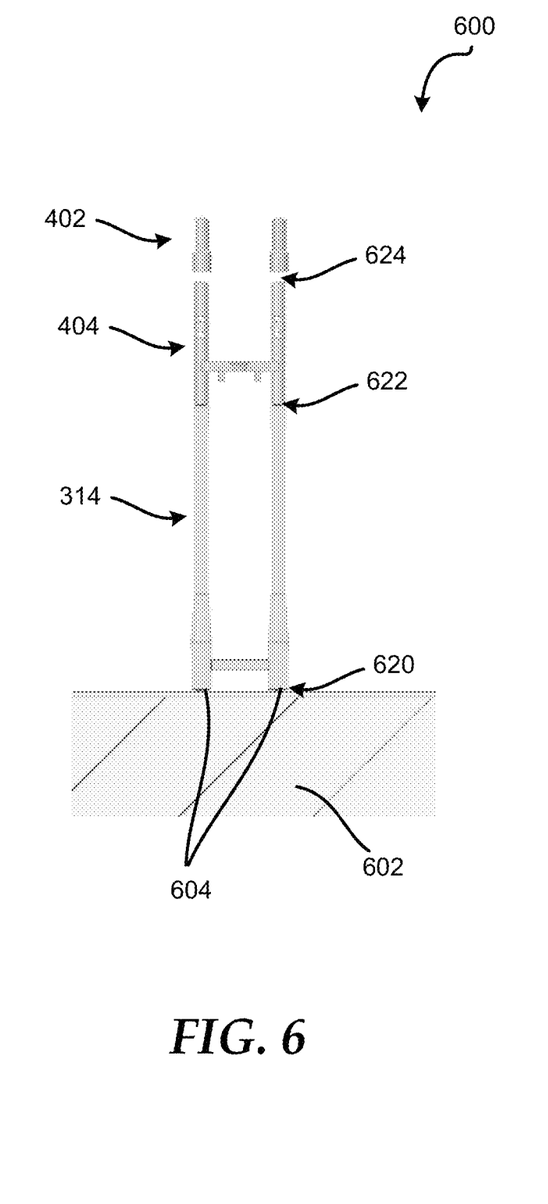
FIG. 6 is a diagram of multiple light pipes with a short device according to at least one embodiment of the present disclosure.

In an example, device 302 may include status LEDs, as shown in FIG. 6 below. Light from the LEDs may be transferred through light pipes 314 of adapter 312 and through light pipes in interface 208 to the front of latch 204 as will be described in detail below. In certain examples, light pipes 314 may be lossy, such that a brightness of light from the LEDs of short device 302 presented at the front of latch 204 may be inconsistent with a brightness of light from the LEDs of long device 202 presented at the front of latch 204 of FIG. 2. A portion 320 of carrier 300 is shown in greater detail in FIG. 4.

Figure 4:
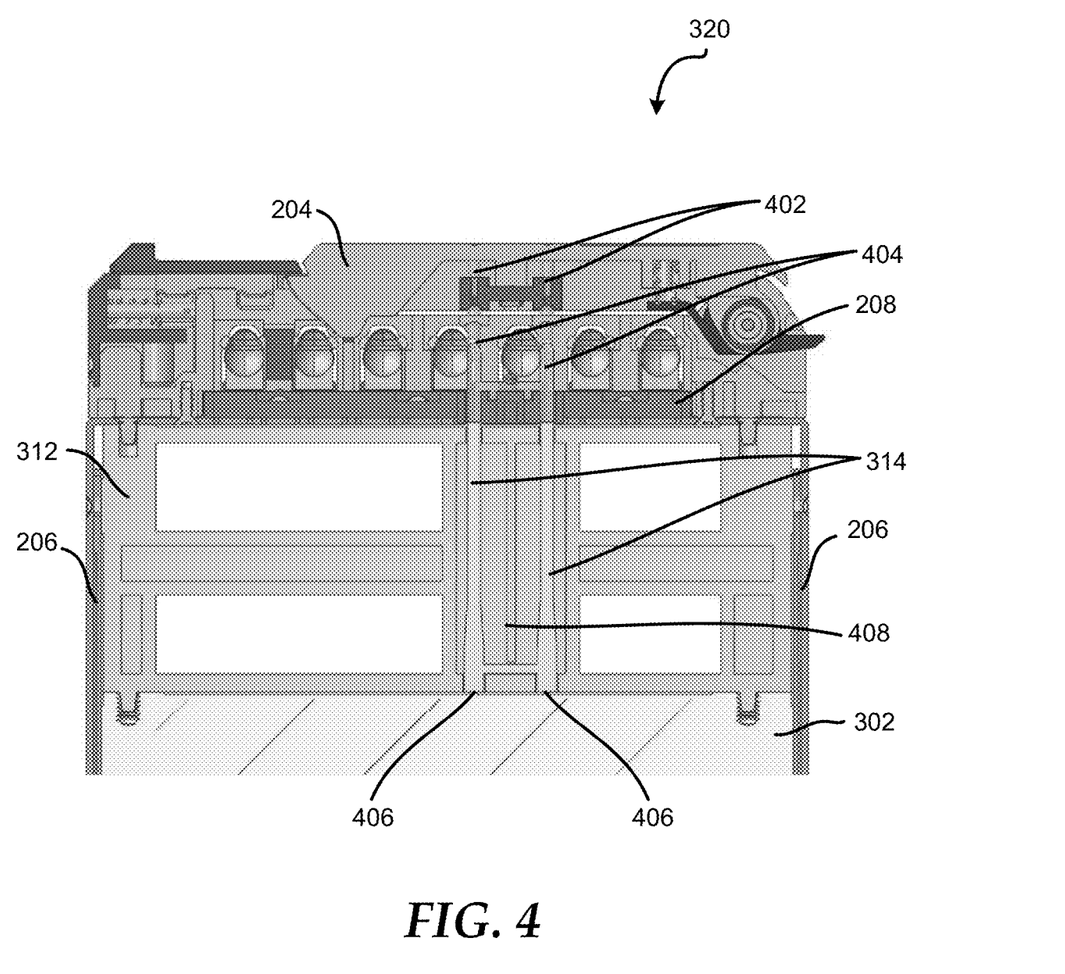
FIG. 4 is a diagram of a portion of the long carrier and the short device according to at least one embodiment of the present disclosure.

FIG. 4 shows a cross section of portion 320 of long carrier 300 and short device 302 according to at least one embodiment of the present disclosure. Latch 204 includes a light pipe 402, and interface 208 includes a light pipe 404. Short device 302 includes LEDs 406. Adapter 312 includes a rib 408 between light pipes 314. In an example, light pipe 404 may extend through both interface 208 and a portion of latch 204.

In an example, light from LEDs 406 may be transferred through light pipes 314 of adapter 312, through light pipes 404 of interface 208, and through light pipes 402 to the front of latch 204. In these examples, the lossy characteristics of light pipes 314 and spaces between light pipes may combine to create the inconsistency between the brightness of light from the LEDs of long device 202 presented at the front of latch 204 of FIG. 2 and the brightness of light from LEDs 406 of short device 302 presented at the front of latch 204 in FIG. 3. In an example, rib 408 is located between light pipes 404 to separate the light paths from each of LEDs 406 through the light pipes 314. In this example, rib 408 may prevent light from bleeding from one light pipe 314 to the other light pipe within adapter 312. As will be described below with respect to FIGS. 6 and 7, different distances between light pipes and LEDs and different distances between different light pipes in device carriers 200 and 300 may create a consistent LED light brightness at the front of latch 204.

FIG. 5 illustrates a portion of an information handling system 500 according to at least one embodiment of the present disclosure. Information handling system 500 includes device carriers 502, 200, and 300, and a backplane 520. Device carrier 502 includes a latch 204 and long edges 206. Device carrier 200 includes lights 530 in the front of latch 204, device carrier 300 includes lights 532 in the front of latch 204, and device carrier 502 includes lights 534 in the front of latch 204. Device carrier 502 may be substantially similar to device carrier 200 or device carrier 300. For example, device carrier 502 may accommodate either a long device, such as long device 202 of FIG. 2, in device carrier 200, or a short device, such as short device 302 within device carrier 300.

In an example, each of devices of device carriers 200, 300, and 502 may communicate with backplane 520 via its respective connector, such as connector 310 of device 302. Backplane 520 may communicate data from one or more components of information handling system 500 to one or more of the devices in device carriers 200, 300, and 502. During operation of information handling system 500, devices in device carriers 200, 300, and 502, such as device 302 within device carrier 300, may provide one or more indicators to an individual associated with the information handling system via the respective sets of lights 530, 532, and 534. While only two lights have been illustrated for each latch, one of ordinary skill in the art would recognize that each device carrier 200, 300, and 502 may include any suitable number of indicator lights. In certain examples, the number of light pipes within a device carrier may match the number of indicator lights on the front of the corresponding latch.

FIG. 6 illustrates a short device light pipe configuration 600 for a short device 602 according to at least one embodiment of the present disclosure. Short device 602 includes LEDs 604. In an example, LEDs 604 may be any suitable type of LEDs including, but not limited to, surface mount LEDs. Short device light pipe configuration 600 includes light pipe sections 402, 404, and 314. In an example, the light pipes 402 may be substantially similar to light pipes 402 in latch 304 of FIG. 4. The light pipes 404 may be substantially similar to light pipes 404 in latch 304 and interface 208 of FIG. 4. Short device light pipe configuration 600 includes air gaps 620, 622, and 624 between different components.

In an example, air gap 620 may be present between LEDs 604 and light pipe 314, air gap 622 may be present between light pipes 404 and 314, and air gap 624 may be present between light pipes 402 and 404. In certain examples, light pipes 314 may case a flux loss as the light transmitted from LEDs 604 along the light pipes. The flux loss along light pipes 314 in short device light pipe configuration 600 may by any particular amount and may be based on the length of the light pipes 314. In an example, the amount of flux loss may include, but is not limited to, four percent, five percent, and six percent. In certain examples, the length of light pipes 314 may be set such that air gaps 620 and 622 are tight air gaps. In these examples, the tight air gaps 620 and 622 may reduce or eliminate flux loss as the light is transmitted from LEDs 604 to light pipes 314, and may reduce or eliminate flux loss as the light is transmitted from light pipes 314 to light pipes 404. Based on the tight air gaps 620 and 622, the flux loss in short device light pipe configuration 600 may be caused by light pipes 402, 404, and 314 and by air gap 624.

FIG. 7 illustrates a long device light pipe configuration 700 for a long device 702 according to at least one embodiment of the present disclosure. Long device 702 includes LEDs 704. In an example, LEDs 704 may be any suitable type of LEDs including, but not limited to, surface mount LEDs. Long device light pipe configuration 700 includes light pipes 402 and 404 and air gaps 720 and 624. In an example, air gap 720 may be a large air gap as compared to air gaps 620 and 622 in FIG. 6.

In an example, the flux loss in long device light pipe configuration 700 may be caused by light pipes 402 and 404 and by air gaps 720 and 624. As stated above with respect to FIG. 6, the flux loss in short device light pipe configuration 600 may be caused by light pipes 402, 404, and 314 and by air gap 624. In an example, any differences in flux loss between light pipe configurations 600 and 700 may be based on the flux loss of light pipe 314 and the flux loss of air gap 720.

Air gap 720 between LEDs 704 and light pipes 404 may case a flux loss as the light transmitted from LEDs 704 to the light pipes. In an example, the flux loss cause by air gap 720 may be related to the size of the air gap. For example, the larger the size of air gap 720 the larger the flux loss. The flux loss across air gap 720 in long device light pipe configuration 700 may by any particular amount including, but is not limited to, four percent, five percent, and six percent. In an example, the size of air gap 720 may be set to cause a flux loss that is substantially equal to the flux loss of light pipes 314 in FIG. 6. In this situation, the flux loss of long device light pipe configuration 700 may be substantially equal to the flux loss of short device light pipe configuration 600 of FIG. 6.

In certain examples, light pipes 404 may be located within respective interface 208 such that when long device 702 is inserted within a device carrier, the large air gap 720 is formed between LEDs 704 and light pipes 404. Additionally, light pipes 404 may be located within respective interface 208 such that when short device 602 and adapter 312 are inserted within a device carrier, light pipes 314 create small or tight air gaps 620 and 622. Thus, the same device carrier may hold short device 602 with adapter 312 and light pipes 314 or long device 702 without a flux loss difference. In this situation, the lights on the front of a device carrier, such as lights 530 on device carrier 200 in FIG. 5, with a long device may have the same brightness level as the lights on the front of another device carrier, such as lights 532 on device carrier 300 in FIG. 5, with a short device.

Figure 8:
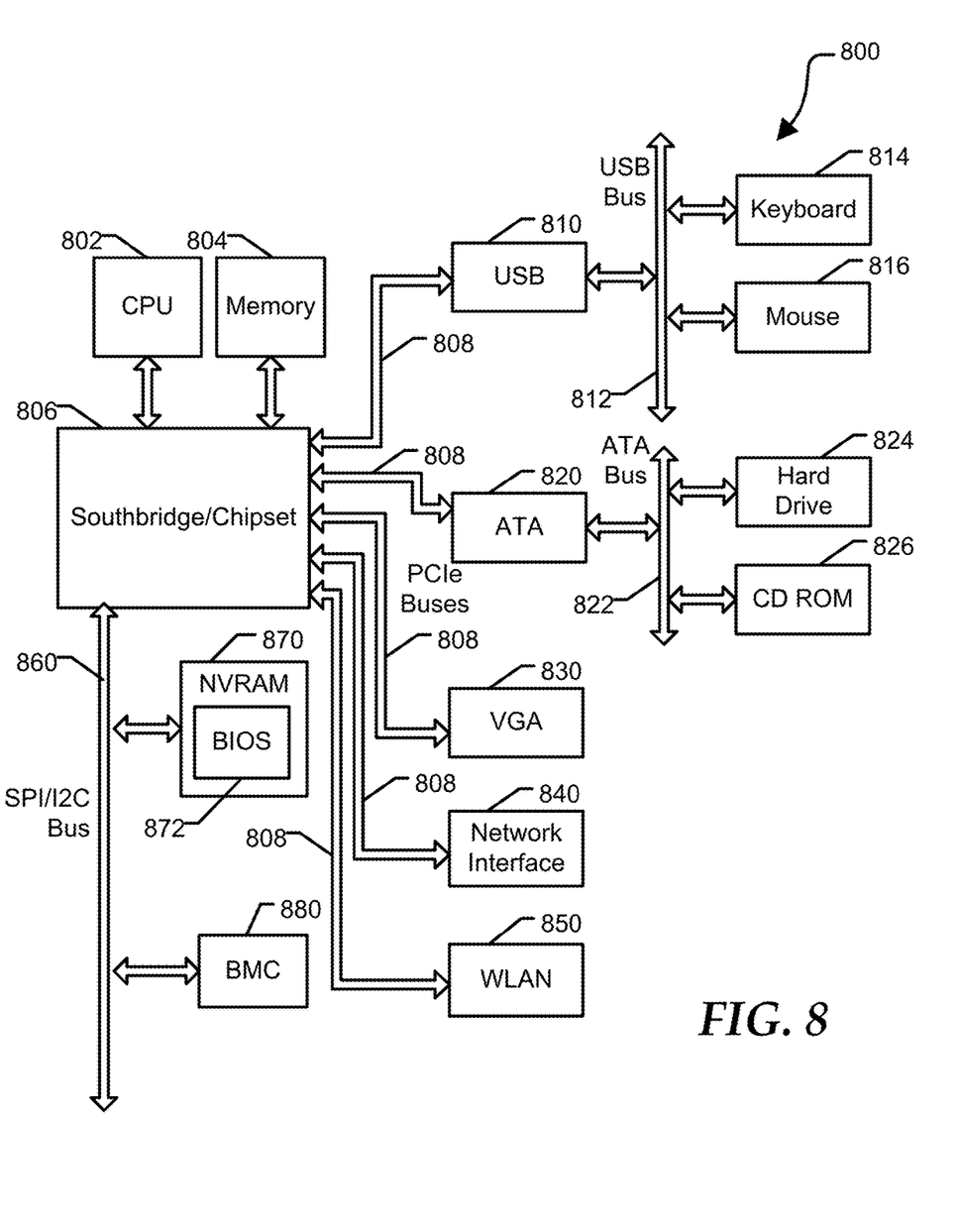
FIG. 8 is a block diagram of an information handling system according to an embodiment of the present disclosure.

FIG. 8 illustrates an information handling system 800 including a processor 802, a memory 804, a chipset 806, a PCI bus 808, a universal serial bus (USB) controller 810, a USB 812, a keyboard device controller 814, a mouse device controller 816, a configuration database 818, an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a flash memory device 870 for storing BIOS code 872, a trusted platform module (TPM) 880, and a baseboard management controller (EC) 890. EC 890 can be referred to as a service processor, and embedded controller, and the like. Flash memory device 870 can be referred to as a SPI flash device, BIOS non-volatile random access memory (NVRAM), and the like. EC 890 is configured to provide out-of-band access to devices at information handling system 800. As used herein, out-of-band access herein refers to operations performed without support of CPU 802, such as prior to execution of BIOS code 872 by processor 802 to initialize operation of system 800. In an embodiment, system 800 can further include a platform security processor (PSP) 874 and/or a management engine (ME) 876. In particular, an x86 processor provided by AMD can include PSP 874, while ME 876 is typically associated with systems based on Intel x86 processors.

PSP 874 and ME 876 are processors that can operate independently of core processors at CPU 802, and that can execute firmware prior to the execution of the BIOS by a primary CPU core processor. PSP 874, included in recent AMD-based systems, is a microcontroller that includes dedicated read-only memory (ROM) and static random access memory (SRAM). PSP 874 is an isolated processor that runs independently from the main CPU processor cores. PSP 874 has access to firmware stored at flash memory device 870. During the earliest stages of initialization of system 800, PSP 874 is configured to authenticate the first block of BIOS code stored at flash memory device 870 before releasing the x86 processor from reset. Accordingly, PSP 874 provides a hardware root of trust for system 800. ME 876 provides similar functionality in Intel-based systems. In another embodiment, EC 890 can provide aspects of a hardware root of trust. The root of trust relates to software processes and/or hardware devices that ensure that firmware and other software necessary for operation of an information handling system is operating as expected.

Information handling system 800 can include additional components and additional busses, not shown for clarity. For example, system 800 can include multiple processor cores, audio devices, and the like. While a particular arrangement of bus technologies and interconnections is illustrated for the purpose of example, one of skill will appreciate that the techniques disclosed herein are applicable to other system architectures. System 800 can include multiple CPUs and redundant bus controllers. One ore more components can be integrated together. For example, portions of chipset 806 can be integrated within CPU 802. In an embodiment, chipset 806 can include a platform controller hub (PCH). System 800 can include additional buses and bus protocols, for example I2C and the like. Additional components of information handling system 800 can include one or more storage devices that can store machine-executable code, one or more communications ports for communicating with external devices, and various input and output (I/O) devices, such as a keyboard, a mouse, and a video display.

For purposes of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

BIOS code 872 can be referred to as a firmware image, and the term BIOS is herein used interchangeably with the term firmware image, or simply firmware. In an embodiment, BIOS 872 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 800. While the techniques disclosed herein are described in the context of a UEFI compliant system, one of skill will appreciate that aspects of the disclosed systems and methods can be implemented at substantially any information handling system having configurable firmware.

BIOS code 872 includes instructions executable by CPU 802 to initialize and test the hardware components of system 800, and to load a boot loader or an operating system (OS) from a mass storage device. BIOS code 872 additionally provides an abstraction layer for the hardware, i.e. a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

The storage capacity of SPI flash device 870 is typically limited to 32 MB or 64 MB of data. However, original equipment manufacturers (OEMs) of information handling systems may desire to provide advanced firmware capabilities, resulting in a BIOS image that is too large to fit in SPI flash device 870. Information handling system can include other non-volatile flash memory devices, in addition to SPI flash device 870. For example, memory 804 can include non-volatile memory devices in addition to dynamic random access memory devices. Such memory is referred to herein as non-volatile dual in-line memory module (NVDIMM) devices. In addition, hard drive 824 can include non-volatile storage elements, referred to as a solid state drive (SSD). For still another example, information handling system 800 can include one or more non-volatile memory express (NVMe) devices. Techniques disclosed herein provide for storing a portion of a BIOS image at one or more non-volatile memory devices in addition to SPI flash device 870.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device carrier for an information handling system, the device carrier comprising:
   a latch to hold the device carrier within the information handling system;
   an interface in physical communication with the latch;
   indicator lights located on a front of the latch;
   first light pipes located within the latch, the first light pipes to provide light to the indicator lights located on the front of the latch;
   second light pipes located within the interface, the second light pipes to provide the light to the first light pipes, wherein the location of the second light pipes enables the same brightness of the light provided to the indicator lights when a long device is inserted within the device carrier as compared to when a short device is inserted within the device carrier; and
   an adaptor in physical communication with the interface, the adaptor includes third light pipes, wherein a first air gap between the second light pipes and the third light pipes is a first tight air gap, wherein the first tight air gap prevents flux loss when the light is provided from the third light pipes to the second light pipes.

2. The device carrier of claim 1, further comprising:
   first and second rails in physical communication with the latch, the first and second rails to mount the long device or the short device within the device carrier.

3. The device carrier of claim 1, wherein a second air gap between light emitting diodes of the short device and the third light pipes is a second tight air gap when the short device is mounted within the device carrier, wherein the second tight air gap prevents flux loss when the light is provided from the light emitting diodes to the third light pipes.

4. The device carrier of claim 1, wherein the third light pipes cause flux loss when the light is transmitted along the third light pipes.

5. The device carrier of claim 4, wherein the flux loss caused in the third light pipes is substantially equal to flux loss caused by a large air gap between the second light pipes and light emitting diodes of the long device when the long device is mounted in the device carrier and the adapter is not mounted in the device carrier.

6. The device carrier of claim 1, wherein an air gap between the second light pipes and light emitting diodes is a large air gap when the long device is mounted within the device carrier, wherein the large air gap causes flux loss when the light is provided from the light emitting diodes to the third light pipes.

7. The device carrier of claim 6, wherein the flux loss caused by the large air gap is substantially equal to flux loss caused by third light pipes in an adapter when the adapter and the short device are mounted in the device carrier.

8. An information handling system comprising:
a first device carrier including:
a first latch to hold the first device carrier within the information handling system;
a first interface in physical communication with the first latch;
first indicator lights located on a front of the first latch;
first light pipes located within the first latch, the first light pipes to provide first light to the first indicator lights located on the front of the first latch; and
second light pipes located within the first interface, the second light pipes to provide the first light to the first light pipes;
a second device carrier including:
a second latch to hold the second device carrier within the information handling system;
a second interface in physical communication with the second latch;
second indicator lights located on a front of the second latch;
third light pipes located within the first latch, the third light pipes to provide second light to the second indicator lights located on the front of the second latch; and
fourth light pipes located within the second interface, the fourth light pipes to provide the second light to the third light pipes, wherein the location of the second light pipes within the first interface and the first latch is substantially the same as the location of the fourth light pipes within the second interface and the second latch, wherein the substantially same location of the second light pipes and the fourth light pipes enables the same brightness of the light provided to the first and second indicator lights when a long device is inserted within the first device carrier as compared to when a short device is inserted within the second device carrier; and
an adaptor in physical communication with the second interface, the adaptor includes fifth light pipes, wherein a first air gap between the fourth light pipes and the fifth light pipes is a first tight air gap, wherein the first tight air gap prevents flux loss when the light is provided from the fifth light pipes to the fourth light pipes.

9. The information handling system of claim 8, wherein a second air gap between first light emitting diodes of the short device and the fifth light pipes is a second tight air gap when the short device is mounted within the second device carrier, wherein the second tight air gap prevents flux loss when the light is provided from the first light emitting diodes to the fifth light pipes.

10. The information handling system of claim 8, wherein the fifth light pipes cause first flux loss when the light is transmitted along the fifth light pipes.

11. The information handling system of claim 10, wherein a second air gap between the second light pipes and light emitting diodes of the long device is a large air gap when the long device is mounted within the first device carrier, wherein the large air gap causes second flux loss when the light is provided from the light emitting diodes to the third light pipes.

12. The information handling system of claim 11, wherein the first flux loss is substantially equal to the second flux loss.

13. The information handling system of claim 8, wherein the first device carrier further comprises:
first and second rails in physical communication with the first latch, the first and second rails to mount the long device within the first device carrier.

14. The information handling system of claim 8, wherein the second device carrier further comprises:
first and second rails in physical communication with the second latch, the first and second rails to mount the short device within the second device carrier.

15. An information handling system comprising:
a first device carrier including:
a first latch to hold the first device carrier within the information handling system;
a first interface in physical communication with the first latch;
first indicator lights located on a front of the first latch;
first light pipes located within the first latch, the first light pipes to provide first light to the first indicator lights located on the front of the first latch; and
second light pipes located within the first interface, the second light pipes to provide the first light to the first light pipes, wherein an air gap between the second light pipes and light emitting diodes of a long device is a large air gap when the long device is mounted within the first device carrier, wherein the large air gap causes first flux loss when the light is provided from the light emitting diodes to the third light pipes; and
a second device carrier including:
a second latch to hold the second device carrier within the information handling system;
a second interface in physical communication with the second latch;
second indicator lights located on a front of the second latch;
third light pipes located within the first latch, the third light pipes to provide second light to the second indicator lights located on the front of the second latch;
fourth light pipes located within the second interface, the fourth light pipes to provide the second light to the third light pipes, wherein the location of the second light pipes within the first interface and the first latch is substantially the same as the location of the fourth light pipes within the second interface and the second latch; and
an adaptor in physical communication with the second interface, the adaptor including fifth light pipes that cause second flux loss when the light is transmitted along the fifth light pipes, wherein the first flux loss is substantially equal to the second flux loss.

16. The information handling system of claim 15, wherein the first flux loss and the second flux loss enable the same brightness of the light provided to the first and second indicator lights when the long device is inserted within the first device carrier as compared to when the short device is inserted within the second device carrier.

17. The information handling system of claim 15, wherein the first device carrier further comprises:
first and second rails in physical communication with the first latch, the first and second rails to mount the long device within the first device carrier.

18. The information handling system of claim 15, wherein the second device carrier further comprises:
first and second rails in physical communication with the second latch, the first and second rails to mount the short device within the second device carrier.

* * * * *